Nov. 16, 1948.  M. A. SCHULTZ ET AL  2,454,219
TRANSPONDER FOR TESTING RADAR DEVICES
Filed April 27, 1946
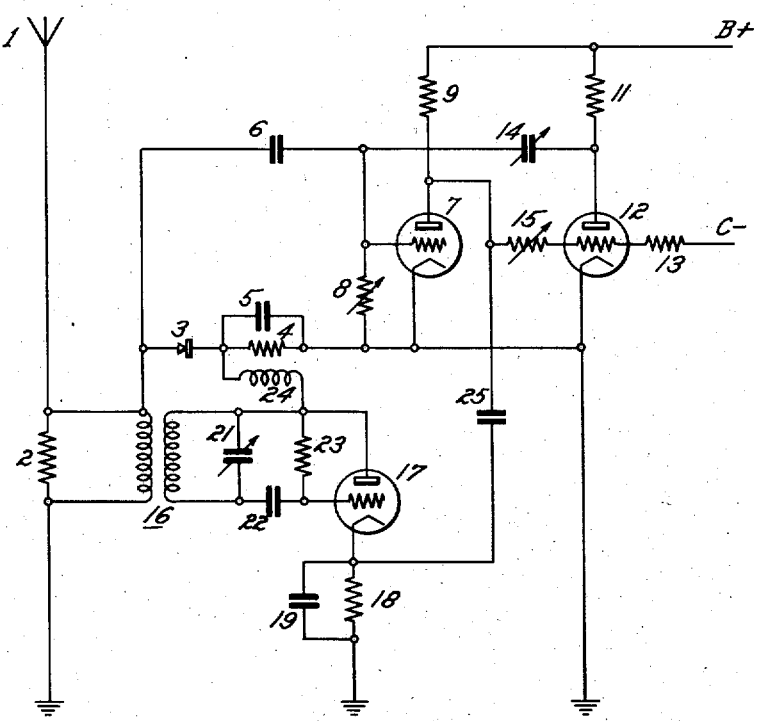
INVENTORS
Mortimer A. Schultz and
Robert E. Bertine, deceased,
by Gladys L. Bertine, administratrix
BY
F. W. Lyle
ATTORNEY Patented Nov. 16, 1948

2,454,219

UNITED STATES PATENT OFFICE 2,454,219

TRANSPONDER FOR TESTING RADAR DEVICES

Mortimer A. Schultz, Baltimore, Md., and Robert E. Bertine, deceased, late of Pittsburgh, Pa., by Gladys L. Bertine, administratrix, Pittsburgh, Pa., assignors to Westinghouse Electric Corporation, East Pittsburgh, Pa., a corporation of Pennsylvania Application April 27, 1946, Serial No. 665,360

4 Claims. (Cl. 250—17)

This invention relates to radio frequency transmission systems and, in particular, relates to such systems in which the transmitting signals consist of short pulses of radiant energy separated from each other by substantial intervals of smaller or zero energy. Such systems are used, for example, in radar systems which have recently come into wide use.

Such transmitters of such pulses as have just been described are often employed to determine the presence or absence in surrounding regions of objects capable of reflecting electromagnetic energy; radar systems are one well-known example of this use. If the transmission system is in its intended operating condition, the absence of an indication on the receiver shows that no such reflecting objects are within its range. However, the absence of a reflecting signal might also be due to some defect in operation of the transmitter or receiver, and it is, accordingly, necessary to provide some arrangement for indicating whether the transmitted wave is being properly radiated. Such testing arrangements may be referred to as electronic echo devices and the invention relates to such devices. In general outline, this arrangement comprises an auxiliary receiving antenna located within a short distance of the main antenna, the receiving antenna being arranged to control, after a predetermined time delay, the generation of a second pulse, preferably of the same wave length as the original pulse, which will be radiated to the main receiver system to produce an indication thereon that the original pulse was duly radiated.

One object of the invention is, accordingly, to provide an arrangement for testing the operativeness of a transmitter and/or receiver system for pulses of radiated energy.

Another object of the invention is to provide an ancillary device for radar systems which shall indicate whether the pulse transmitter is performing its intended operations.

Another object of the invention is to provide an arrangement by which the incidence of an incoming signal on a receiving system will generate a pulse of radio frequency energy after a predetermined time delay.

Other objects of the invention will become apparent upon reading the following description, taken in connection with the drawings, in which the single figure is a schematic diagram of one circuit adapted to embody the principles of the invention.

Referring in detail to the drawings, a receiving antenna 1, passing energy to ground through an impedance 2, is arranged to be located within any suitable short distance of a radar transmitter, or other radiator of pulse electromagnetic energy (not shown). In effective shunt to the terminals of the impedance 2 is connected a rectifier 3 which may, for example, be an electronic diode, connected in series with a resistor 4 which is shunted by a capacitor 5. The relative values of the capacitor 5 and resistor 4 are proportioned in ways well known to those skilled in the art so that the pulses of energy incident upon the antenna 1 will rapidly charge the capacitor 5 to a substantial voltage, whereupon the resistor 4 gradually discharges this voltage. Such an arrangement will produce a saw tooth voltage wave across the terminals of the capacitor 5, this wave rising rapidly from its minimum to its maximum value and then gradually sinking, through the discharge of the capacitor, to a lower value which it will reach at the time of incidence on the antenna 1 of a second energy pulse. Such a cycle will be continued indefinitely at the frequency with which the energy pulses arrive at the antenna 1.

The radio frequency voltage pulse across the impedance 2 is also transmitted through a second capacitor 6 to the control electrode of a tube 7, this control electrode being connected through a resistor 8 to the grounded cathode of the tube 7. The anode of the tube 7 is connected through a resistor 9 to the positive terminal B+ of a direct-current voltage source of which the negative terminal is grounded. The positive terminal B+ is likewise connected through a second resistor 11 to the anode of a second tube 12 having its cathode grounded and having a control electrode connected through a resistor 13 to the negative terminal C— of a second direct current biasing voltage source having its positive terminal grounded. The anode of the tube 12 is connected through a capacitor 14 to the control electrode of the tube 7, and the control electrode of the tube 12 is connected through a resistor 15 to the anode of the tube 7. The tubes 7 and 12, as just described, will be recognized as constituting a multi-vibrator of a type well known to those skilled in the art.

The antenna impedance 2 is coupled through a transformer 16, or other suitable coupling arrangement, to an electron tube 17 having its cathode grounded through a resistor 18 shunted by a capacitor 19. The secondary winding of the transformer 16 is shunted by a suitable variable capacitor 21 having one terminal connected to the anode of the tube 17 and having its other terminal connected through a capacitor 22 to the control electrode of the tube 17. The anode of the tube 17 is connected to its control electrode through a resistor 23 and is likewise connected through an inductor 24 to the output terminal of the rectifier 3. With the arrangement just described, it will be evident that the voltage drop across the antenna impedance 2 is rectified by a rectifier 3 and impressed through inductor 24 across the anode and cathode circuit of the tube 17. The connections of the tube 17 will be recognized as constituting a generator of high frequency oscillations which are preferably tuned to the same wave length as those received by the antenna 1, but are interrupted after a limited number of cycles by the blocking effect of the network capacitor 22. Such oscillators are known in the art as self-blocking oscillators. The anode of tube 7 is connected through capacitor 25 to the ungrounded terminal of resistor 18.

The mode of operation of the above-described circuit network is believed to be substantially as follows: The incidence of a pulse of radio frequency energy on the antenna 1 produces a voltage drop of similar frequency on the impedance 2 and the rectification of this voltage drop through the rectifier 3 impresses on the capacitor 5 the abruptly rising forward edge of a saw tooth voltage wave, as previously stated. The abrupt rise of the voltage wave across capacitor 5 is transmitted through capacitor 6 to impress a positive pulse of potential on the control electrode of the tube 7. This initiates current flow through the tube 7 which coacts with the tube 12 to constitute a multi-vibrator. Such multi-vibrators have the property of permitting current flow through one tube for a predetermined interval of time fixed in ways well known in the art by the values of the resistors 9, 11, 15 and 8 and the capacitor 14, thereafter suddenly switching current flow from the tube 7 to the tube 12. Such a reaction of the tubes 7 and 12 produces between the anode and the cathode of the tube 7 a substantially square topped voltage wave, the interval between the forward and rear edges of which may be adjusted by varying the values of the resistors 8 and 15 and the capacitor 14 in ways well known in the art.

The saw tooth voltage across the capacitor 5 is likewise impressed through inductor 24 upon the anode-to-cathode circuit of the blocked oscillator 17, but the circuit constants of this tube are so arranged that it requires the impression on its anode-to-cathode circuit of an ancillary voltage pulse to start it into oscillation. Such a voltage pulse is impressed through the capacitor 25 from the anode of the multi-vibrator tube 7 above mentioned, coincidentally with the rear vertical edge of the square-topped wave generated by multi-vibrators 7—12. The sequence of events thus outlined, accordingly, results in the intervening of a time equal to the interval separating the forward and rear edges of the square-topped voltage pulse generated between the anode and cathode of tube 7 between the time of incidence of a wave pulse on the antenna 1 and the starting of oscillations in the blocked oscillator 17. The tube 17 continues to generate oscillations only until they are blocked by the operation of its control electrode circuit, as above mentioned, and these oscillations are impressed through the transformer 16 upon the circuit of the antenna 1 and reradiated. The entire arrangement thus described, accordingly, radiates a return pulse of energy toward the receiver system associated with the radar transmitter and does so after a time interval fixed by the respective forward and rear vertical edges of the voltage pulse generated by the multi-vibrator comprising tubes 7 and 12.

While the multi-vibrator comprising tubes 7 and 12 is a time delay device which has been found to be effective, it will be recognized by those skilled in the art that other known arrangements for introducing a time delay between the incidence of an input signal and the energization of an output circuit may be employed in place thereof. It will likewise be evident that other types of oscillator than the so-called block oscillator described above may be substituted for the tube 17, provided these oscillators have the property of generating for a predetermined time interval only after the incidence of an exciting energy pulse.

The fact that the plate voltage of the oscillator 17 is supplied by the rectified energy stored in the capacitor 5, and that this is substantially proportional to the amplitude of the energy pulse incident upon the antenna 1, is a valuable feature inasmuch as the return pulse transmitted from the antenna 1 to the radar receiver is substantially proportional to the strength of the output of the radar transmitter and, thus, may furnish valuable information as to the operating condition of the latter.

What is claimed is:

1. An electronic echo device comprising a receiving circuit, means for rectifying energy pulses incident upon said receiving circuit to charge an energy storage device, means for energizing a generator of oscillations by the energy stored in said storage device, a time delay network having its input circuit energized from said storage device and having its output circuit connected to initiate generation of oscillations by said oscillation generator, and means for radiating the output of said oscillation generator.

2. An electronic echo device comprising a receiving circuit, means for rectifying energy pulses incident upon said receiving circuit to charge an energy storage device, means for energizing a generator of intermittent oscillations by the energy stored in said storage device, a time delay network having its input circuit energized from said storage device and having its output circuit connected to initiate generation of oscillations by said oscillation generator, and means for radiating the output of said oscillation generator.

3. An electronic echo device for radar systems comprising wave receiving means, means to rectify the output of said wave receiving means to charge an energy storage device, means to supply a generator of radio frequency energy pulses with the output of said energy storage device, means for timing the initiation of the output wave of a multi-vibrator by the charging of said energy storage device, means for initiating oscillations of said oscillation generator by the output of said multi-vibrator, and means for radiating the oscillations generated by said oscillation generator.

4. An electronic echo device for transmitters of pulsed radiant energy comprising receiving means energized by said pulse radiant energy, a capacitor charged through a rectifier by the output of said receiving means, and provided with a discharge circuit proportioned to produce saw tooth voltage waves on said capacitor, a time delay circuit having input terminals energized from said capacitor, and an oscillation generator adapted to produce intermittent pulses of energy, and means for initiating generation of said intermittent pulses by said oscillation generator connected to the output circuit of said time delay means.

MORTIMER A. SCHULTZ.
GLADYS L. BERTINE,
*Administratrix of the Estate of Robert E. Bertine, Deceased.*

REFERENCES CITED

The following references are of record in the file of this patent:

UNITED STATES PATENTS

| Number | Name | Date |
|---|---|---|
| 2,045,224 | Gerhard | June 23, 1936 |
| 2,262,838 | Deloraine et al. | Nov. 18, 1941 |
| 2,333,688 | Shepard, Jr. | Nov. 9, 1943 |